US011566689B2

(12) United States Patent
Tan

(10) Patent No.: US 11,566,689 B2
(45) Date of Patent: Jan. 31, 2023

(54) CHAIN TYPE STEPLESS TRANSMISSION

(71) Applicant: Bo Tan, Beijing (CN)

(72) Inventor: Bo Tan, Beijing (CN)

(*) Notice: Subject to any disclaimer, the term of this patent is extended or adjusted under 35 U.S.C. 154(b) by 328 days.

(21) Appl. No.: 16/955,933

(22) PCT Filed: Dec. 11, 2018

(86) PCT No.: PCT/CN2018/000416
§ 371 (c)(1),
(2) Date: Jun. 19, 2020

(87) PCT Pub. No.: WO2019/119531
PCT Pub. Date: Jun. 27, 2019

(65) Prior Publication Data
US 2020/0340555 A1 Oct. 29, 2020

(30) Foreign Application Priority Data

Dec. 20, 2017 (CN) .......................... 201711380938.0

(51) Int. Cl.
*F16H 9/24* (2006.01)
*F16H 55/56* (2006.01)
(52) U.S. Cl.
CPC ............... *F16H 9/24* (2013.01); *F16H 55/56* (2013.01)
(58) Field of Classification Search
CPC .................................. F16H 9/24; F16H 55/56
USPC ............................................................ 474/8
See application file for complete search history.

(56) References Cited

U.S. PATENT DOCUMENTS 4,878,883 A   11/1989   Wheless

FOREIGN PATENT DOCUMENTS

| CN | 1467392 A | 1/2004 |
|----|-----------|--------|
| CN | 2675957 Y | 2/2005 |
| CN | 201116591 Y | 9/2008 |
| CN | 101280835 A | 10/2008 |
| CN | 102094945 A | 6/2011 |
| CN | 103791050 A | 5/2014 |
| CN | 105035251 A | 11/2015 |
| CN | 106415068 A | 2/2017 |
| CN | 106996440 A | 8/2017 |

(Continued)

OTHER PUBLICATIONS

First office action issued for counterpart Chinese patent application No. 201711380938.0, dated May 8, 2019.

(Continued)

*Primary Examiner* — Gene O Crawford
*Assistant Examiner* — Emily R Kincaid
(74) *Attorney, Agent, or Firm* — Westbridge IP LLC

(57) ABSTRACT

The disclosure provides a chain type stepless transmission, including: a box, a pair of active cone discs including a fixed cone disc and a moving cone disc, a pair of passive cone discs including a fixed cone disc and a moving cone disc, an input shaft, an output shaft and a chain, there are a group of pulleys in the middle of each pair of passive cone discs and in the middle of each pair of active cone discs respectively, and the number of the group of pulleys may be an arbitrary value, such as 2, 3, 4, 5, 6, 7, 8, etc. In the stepless transmission, the fixed cone disc and the moving cone disc then transmit power from the input shaft to the output shaft through the chain, thereby realizing a high power of power transmission and a high torque.

7 Claims, 21 Drawing Sheets

(56) References Cited

FOREIGN PATENT DOCUMENTS

| | | | |
|---|---|---|---|
| CN | 107218364 A | 9/2017 | |
| CN | 107448569 A * | 12/2017 | ............ F16H 55/54 |
| CN | 107448569 A | 12/2017 | |
| CN | 109114184 A | 1/2019 | |
| DE | 142236 C | 4/1902 | |
| DE | 686733 C | 1/1940 | |
| JP | S6196252 A * | 5/1986 | |
| JP | 2001248700 A | 9/2001 | |
| JP | 2002250420 A | 9/2002 | |
| JP | 2017106482 A | 6/2017 | |
| WO | 2004040168 A1 | 5/2004 | |
| WO | WO-2004040168 A1 * | 5/2004 | ............... F16H 9/24 |

OTHER PUBLICATIONS

International search report issued for corresponding PCT application No. PCT/CN2018/000416, dated Feb. 27, 2019.
Search report for counterpart Chinese patent application No. 201711380938.0, dated May 8, 2019.
Second office action issued for counterpart Chinese patent application No. 201711380938.0, dated Aug. 13, 2019.
Extended European Search Report issued for counterpart European Patent Application No. 18891860.1, dated Aug. 12, 2021.

* cited by examiner

CHAIN TYPE STEPLESS TRANSMISSION

CROSS-REFERENCE TO RELATED APPLICATIONS

This application is a National Stage of International Application No. PCT/CN2018/000416, filed Dec. 11, 2018, which claims priority to Chinese Patent Application No. 201711380938.0, filed Dec. 20, 2017, both of which are hereby incorporated by reference in their entireties.

TECHNICAL FIELD

The invention belongs to the field of a stepless transmission.

BACKGROUND

Since the most successful stepless transmission in the past was a continuously variable transmission (CVT), which transmits power by using a frictional force between a cone disc and a steel belt. A limitation of such a CVT limits a widespread use of the stepless transmission, while the present invention provides a stepless transmission which transmits power by using a pair of active cone discs, a pair of passive cone discs, a chain, and a chain wheel.

SUMMARY

An object of the present invention is to solve the problem that the previous CVT transmits power directly by using the friction, and to provide a stepless transmission which transmits power by an engagement of a chain and a movable friction plate chain wheel.

The stepless transmission of the present invention comprises a box, an input shaft, an output shaft, a fixed cone disc, a moving cone disc, a chain having a chain shaft wheel, a movable friction plate chain wheel, a fixed friction plate, a fixed friction plate positioning shaft, and a pressurizing shaft, wherein: the chain and the movable friction plate chain wheel are freely overlapped; the movable friction plate chain wheel is engaged with the chain; when the pressurizing shaft presses tightly against the movable friction plate chain wheel and the fixed friction plate, the movable friction plate chain wheel, the fixed friction plate, the fixed friction plate positioning shaft, and a pulley are fixed together, and the movable friction plate chain wheel is engaged with the chain to transmit power; and when the pressurizing shaft releases the movable friction plate chain wheel and the fixed friction plate, the movable friction plate chain wheel is disengaged from the fixed friction plate, the movable friction plate chain wheel rotates freely, and the chain shaft wheel on the chain freely overlaps the movable friction plate chain wheel.

The stepless transmission adopting the structure of the present invention has the following beneficial effects of:
1. high power of power transmission and torque;
2. small power loss; and
3. realizing the mechanical stepless transmission.

BRIEF DESCRIPTION OF DRAWINGS

The accompanying drawings are described below.

DESCRIPTION OF EMBODIMENTS

Figure 1:
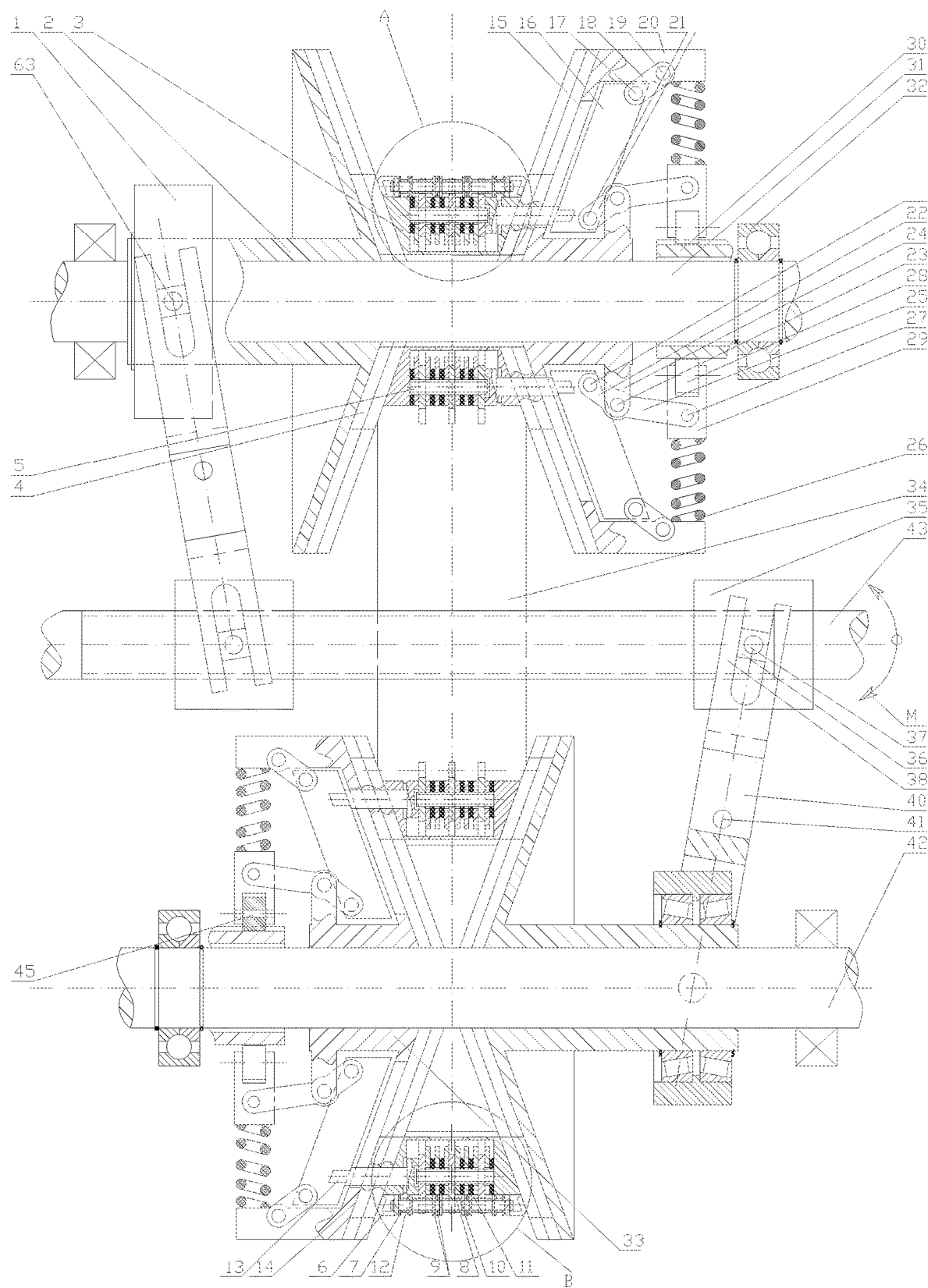
FIG. 1 is a structural view of the stepless transmission in an overspeed state.

As can be seen from FIGS. 1-6, the stepless transmission of the present invention comprises: a box 60; a pair of active cone discs cooperating with an input shaft 42, wherein the pair of active cone discs include a fixed cone disc 33 and a moving cone disc 2, the fixed cone disc 33 is fixedly connected to or integrated with the input shaft 42, and the moving cone disc 2 is capable of sliding on the input shaft 42 relative to the input shaft 42 but not capable of rotating relative to the input shaft 42; and a pair of passive cone discs cooperating with an output shaft 31, wherein the pair of passive cone discs include a fixed cone disc 33 and a moving cone disc 2, the fixed cone disc 33 is fixedly connected to or integrated with the output shaft 31, and the moving cone disc 2 is capable of sliding on the output shaft 31 relative to the output shaft 31 but not capable of rotating relative to the output shaft 31. There are a group of pulleys 3 in the middle of each pair of passive cone discs and in the middle of each pair of active cone discs respectively. The number of the group of pulleys 3 may be an arbitrary value, such as 2, 3, 4, 5, 6, 7, 8, etc. Each pulley 3 has its own cone disc guide rail 14 at its own pair of cone discs. As the distance between the fixed cone disc 33 and the moving cone disc 2 increases and decreases, the pulley 3 can slide back and forth along the cone disc guide rail 14, so as to achieve that the pulley 3 goes close to or away from the input shaft 42 or the output shaft 31. The pulley 3 is provided with a movable friction plate chain wheel 8, a fixed friction plate 10, a movable friction plate 11, a central shaft 5, a fixed friction plate positioning shaft 46, and a pressurizing shaft 13. A fixed cone disc cantilever 20 is fixedly connected to or integrated with the fixed cone disc support 24 and the fixed cone disc 33. A second pressure hinge plate 22 is fixedly connected to or integrated with a pressure bar 25. The first pressure hinge plate 18 has one end that is hinged to a pressure plate 16 through a first pressure plate hinge pin 17, and the other end that is hinged to the fixed cone disc cantilever 20 through a cantilever hinge pin 19. The second pressure hinge plate 22 has one end that is hinged to the pressure plate 16 through a second pressure plate hinge pin 21, and the other end that is hinged to the fixed cone disc support 24 through a fixed cone disc support hinge pin 23. The presser bar 25 has one end that is hinged to the fixed cone disc support 24 through the fixed cone disc support hinge pin 23, and the other end that is hinged to a wheel seat 29 through a pressure bar hinge pin 27. The wheel seat 29 has one end that is fitted with a wheel shaft 45, the wheel shaft 45 is in a central shaft hole of a wheel 28, the wheel 28 rotates about the wheel shaft 45 and rolls on a cam 30. The cam 30 is fixedly connected to the box 60. A stopper 1 is matched with the moving cone disc 2 through a bearing 32 so that the moving cone disc 2 can slide back and forth only along the input shaft 42 or the output shaft 31. When the moving cone disc 2 rotates along with the input shaft 42 or the output shaft 31, the stopper 1 does not rotate along with the moving cone disc 2. The moving cone disc 2 is matched with the input shaft 42 or the output shaft 31 through a spline. The moving cone disc 2 can slide only on the input shaft 42 or the output shaft 31 and cannot rotate relative to the input shaft 42 or the output shaft 31. The fixed cone disc 33 is fixedly connected to the input shaft 42 or the output shaft 31. The elastic force of a pressure spring 26 has one end that acts on the fixed cone disc cantilever 20 and the other end that acts on the wheel seat 29. When the wheel 28 falls in the region a (i.e., an engagement region) of the cam 30, the elastic force of the pressure spring 26 acts on the movable friction plate chain wheel 8 through the wheel seat 29, the pressure bar 25, the second pressure hinge plate 22, the pressure plate 16, and the pressurizing shaft 13. The movable friction plate chain wheel 8 presses tightly against the fixed friction plate 10. The fixed friction plate 10 presses tightly against the movable friction plate 11. A square hole in the center of the movable friction plate chain wheel 8 and a square hole in the center of the movable friction plate 11 are in shape-line fit with a square cross-section of the central shaft 5. A semicircular notch of the fixed friction plate 10 is matched with the fixed friction plate positioning shaft 46. A pulley positioning shaft hole 57 is matched with the fixed friction plate positioning shaft 46. The fixed friction plate 10 is matched with the pulley 3 through the fixed friction plate positioning shaft 46, and the fixed friction plate 10 can only slide on the fixed friction plate positioning shaft 46 without rotation. When the wheel 28 falls in a region c (i.e., a separation region), the wheel 28 is jacked up by the cam 30, and the elastic force of the pressure spring 26 is exerted on the cam 30 by the wheel 28. The wheel 28 drives the wheel seat 29, the pressure bar 25, the second pressure hinge plate 22, and the pressure plate 16 to move simultaneously. The pressure plate 16 is disengaged from the pressurizing shaft 13, and the movable friction plate chain wheel 8, the fixed friction plate 10, and the movable friction plate 11 are released, and this results in that the pressing force to the movable friction plate chain wheel 8, the fixed friction plate 10, and the movable friction plate 11 is disappeared. The movable friction plate 11 and the movable friction plate chain wheel 8 are freely moved. The fixed cone disc 33 and the moving cone disc 2 hold the chain 34 at a certain operating pitch radius position. A speed regulating screw 43 rotates to drive a speed regulating nut 35 to move back and forth, and then drives the stopper 1 and the moving cone disc 2 through a speed regulating lever 40 to move back and forth, and a speed regulating lever shaft 41 is fixed on the box 60.

The pressure spring 26 has one end that abuts against the wheel seat 29 and acts on the pressure bar 25 through the wheel seat 29, i.e., the pressure spring 26 has one end that acts on the pressure bar 25 and the other end that abuts against the fixed cone disc cantilever 20. When the wheel 28 falls in the region a (i.e., an engagement region) of the cam 30, the pressure spring 26 is extended. When the wheel 28 falls in a region c (i.e., a separation region) of the cam 30, the wheel 28 is jacked up by the cam 30, and the pressure spring 26 is compressed.

The chain 34 is composed of a chain shaft 12, a chain shaft wheel 7, a chain piece 9, and a chain edge piece 6.

The operating principle of the stepless transmission is shown as follows.

1. Working Process of Power Transmission:

Power enters the transmission from the input shaft 42, and on the pulley 3 in the region a (i.e., the engagement region), the elastic force of the pressure spring 26 presses the movable friction plate chain wheel 8 and the fixed friction plate 10 tightly on the pulley 3, i.e., the movable friction plate chain wheel 8 are fixed, through the pulley 3, on a pair of active cone discs and a pair of passive cone discs respectively, that is, the chain 34 is engaged with the movable friction plate chain wheel 8 of the pair of active cone discs and the movable friction plate chain wheel 8 of the pair of passive cone discs respectively. The input shaft 42 drives the pair of active cone discs to rotate. The pair of active cone discs drive the pair of passive cone discs to rotate through the movable friction plate chain wheel 8 of a pair of movable cone discs, a chain 34, and the movable friction plate chain wheel 8 of the pair of passive cone discs, and then drive the output shaft 31 to rotate and output power.

2. Speed regulation process: The speed regulating screw 43 rotates to drive the speed regulating lever 40 to swing, the speed regulating lever 40 drives the stopper 1 to move back and forth, and the stopper 1 drives the moving cone disc 2 to move back and forth, resulting in that the pulley 3 slides back and forth along the cone disc guide rail 14 together with the movable friction plate chain wheel 8, and a change in the operating pitch radius of the pair of active cone discs and the pair of passive cone discs on which the chain 34 matches with the movable friction plate chain wheel 8, which thus changes the rotating speed ratio of the input shaft 42 to the output shaft 31, realizes the speed ratio change of transmission, and realizes the speed regulation of transmission.

3. The working process in which movable friction plate chain wheel 8 is pressed tightly against the pulley 3 and integrated with the pulley 3:

(1) When the wheel 28 falls in the region a (i.e., an engagement region) of the cam 30, under the elastic force of the pressure spring 26, the movable friction plate chain wheel 8, the fixed friction plate 10, the movable friction plate 11, and the pulley 3 are pressed tightly and have been integrated. The movable friction plate chain wheel 8 is engaged with the chain 34 to transmit power.

(2) When the wheel 28 falls in a region b (i.e., a separating region) of the cam 30, the wheel 28 is jacked up by the cam 30, and the elastic force of the pressure spring 26 is exerted on the cam 30 by the wheel 28. The wheel 28 drives the wheel seat 29, the pressure bar 25, the second pressure hinge plate 22, and the pressure plate 16 to move simultaneously. The pressure plate 16 is disengaged from the pressurizing shaft 13, and the fixed friction plate 10, the movable friction plate 11, and the movable friction plate chain wheel 8 are released, and this results in that the pressing force to the fixed friction plate 10, the movable friction plate 11 and the movable friction plate chain wheel 8 is disappeared. The movable friction plate 11 and the movable friction plate chain wheel 8 are freely moved.

(3) When the wheel 28 falls in a region c (i.e., a separation region), the movable friction plate 11 and the movable friction plate chain wheel 8 are not subject to the pressing force and are freely moved.

(4) When the wheel 28 falls in a region d (i.e., an engaging region) of the cam 30, the chain 34 and the movable friction plate chain wheel 8 are freely overlapped, the elastic force of the pressure spring 26 acts on the movable friction plate chain wheel 8 through the wheel seat 29, the pressure lever 25, the second pressure hinge plate 22, the pressure plate 16, and the pressurizing shaft 13. The movable friction plate chain wheel 8 presses tightly against the fixed friction plate 10. The fixed friction plate 10 presses tightly against the movable friction plate 11 to integrate the movable friction plate chain wheel 8, the fixed friction plate 10, the movable friction plate 11 and the pulley 3. The movable friction plate chain wheel 8 is engaged with the chain 34 to transmit power, i.e., after the movable friction plate chain wheel 8 presses tightly against the fixed friction plate 10, the movable friction plate chain wheel 8 is engaged with the chain 34 to transmit power. The movable friction plate chain wheel 8 is a chain wheel which can be engaged with the chain 34. A square hole in the center of the movable friction plate chain wheel 8 and a square hole in the center of the movable friction plate 11 are in shape-line fit with a square cross-section of the central shaft 5. A semicircular notch of the fixed friction plate 10 is matched with the fixed friction plate positioning shaft 46. A pulley positioning shaft hole 57 is matched with the fixed friction plate positioning shaft 46. The fixed friction plate 10 is matched with the pulley 3 through the fixed friction plate positioning shaft 46, and the fixed friction plate 10 can only slide on the fixed friction plate positioning shaft 46 without rotation.

As can be seen in FIG. 1, the distance between the pair of passive cone discs on the output shaft 31 is maximum; the operating pitch diameter of the chain 34 on the pair of passive cone discs is minimum; and the operating pitch diameter of the chain 34 on the pair of active cone discs is maximum and the transmission has the maximum overspeed ratio.

Figure 2:
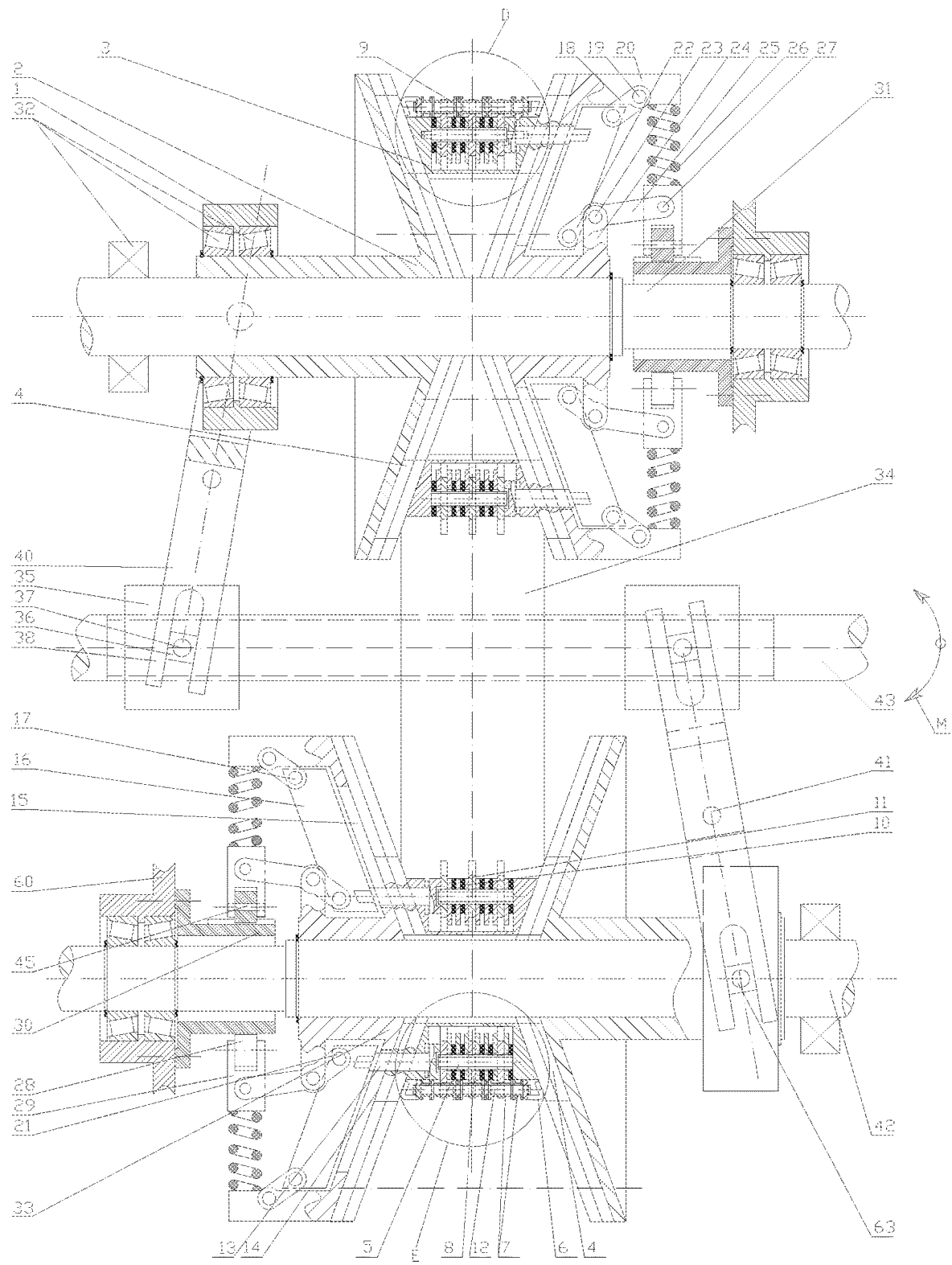
FIG. 2 is a structural view of the stepless transmission in a decelerating state.

As can be seen in FIG. 2, the distance between the pair of passive cone discs is minimum; the operating pitch diameter of the chain 34 on the pair of passive cone discs is maximum; and the operating pitch diameter of the chain 34 on the pair of active cone discs is minimum and the transmission has the maximum reduction ratio.

Figure 3:
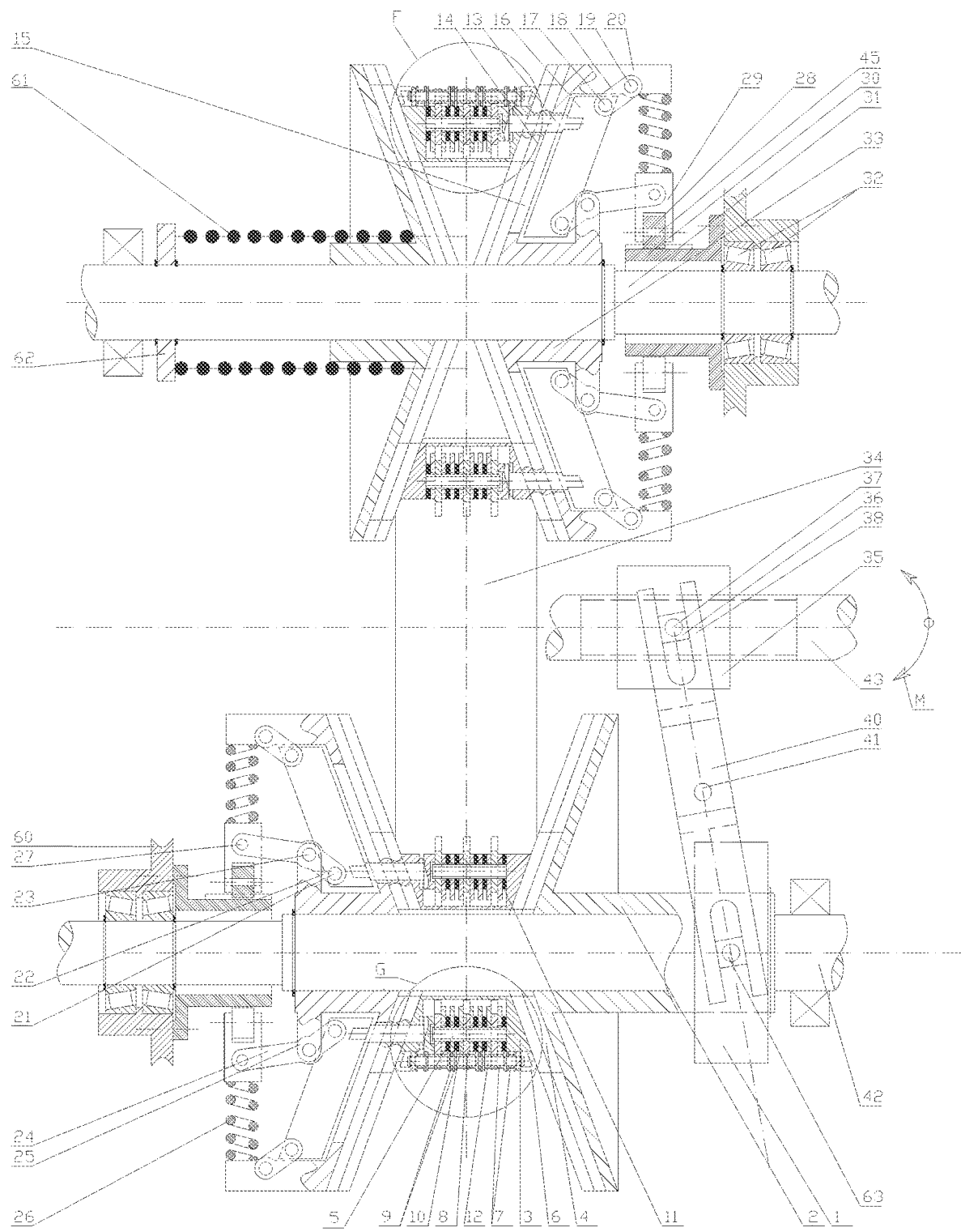
FIG. 3 is a structural view of the stepless transmission in a decelerating state in the fourth certain example, in which the movable cone discs 2 in a pair of passive cone disc have movable cone disc springs 61 for speed regulation.

FIG. 3 shows structure of a fourth certain example. There is a moving cone disc spring 61 behind the moving cone disc 2 on the output shaft 31, and the moving cone disc spring 61 applies a pressure to the moving cone disc 2 for speed regulation. The moving cone disc spring 61 has one end against the moving cone disc 2 and the other end against the moving cone disc spring base 62 which is fixed on the output shaft 31. Alternatively, there is a moving cone disc spring 61 behind the moving cone disc 2 on the input shaft 42, which applies a pressure to the moving cone disc 2 for speed regulation. The moving cone disc spring 61 has one end against the moving cone disc 2 and the other end against the moving cone disc spring base 62 which is fixed on the input shaft 42. The moving cone disc spring 61 pushes the moving cone disc 2 to press tightly against the conveyor chain 34.

Figure 4:
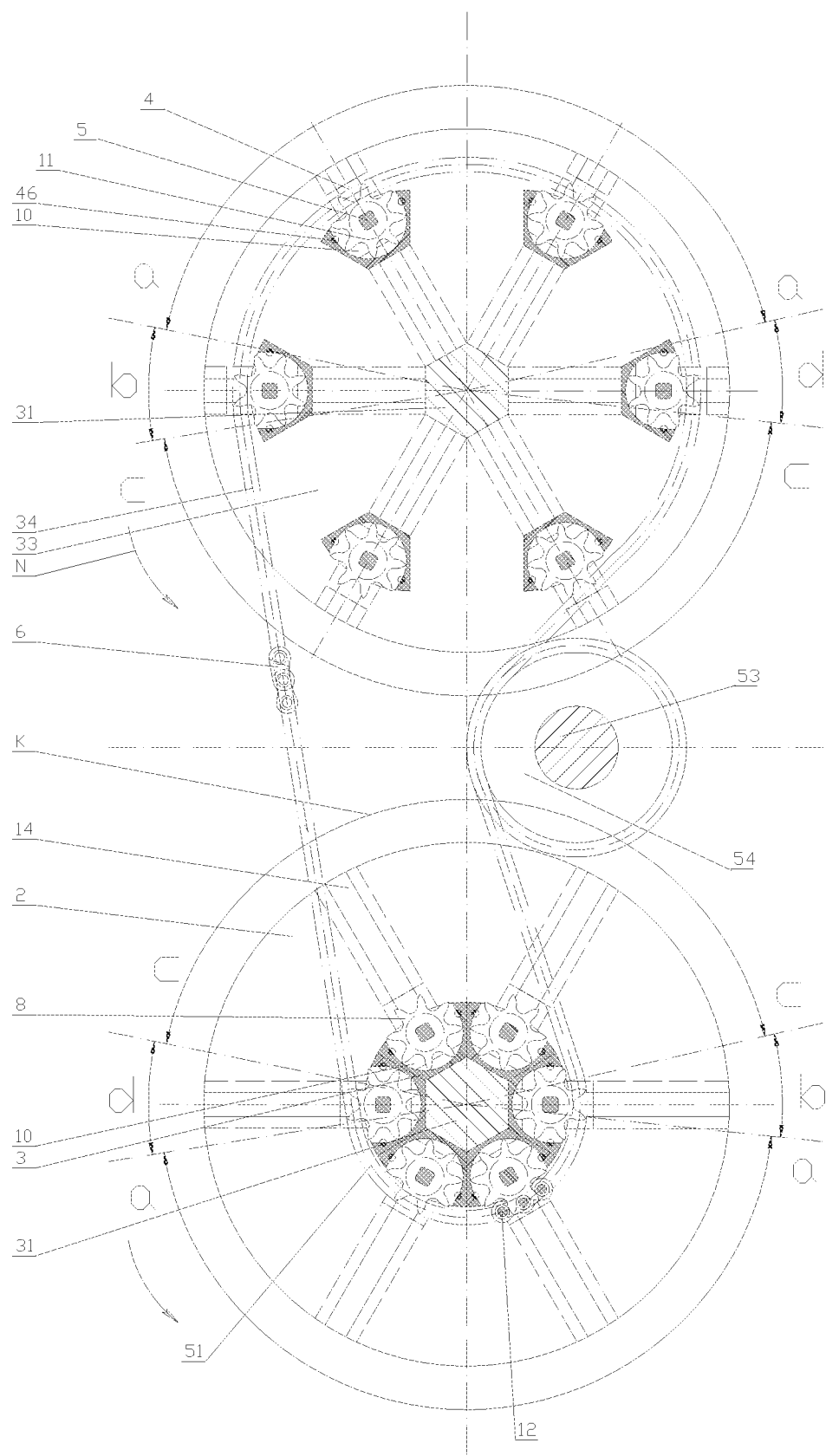
FIG. 4 is a front structural view of the stepless transmission having a tensioning wheel 54.

As can be seen in FIG. 4, the tensioning wheel 54 presses tightly against the chain 34.

Figure 5:
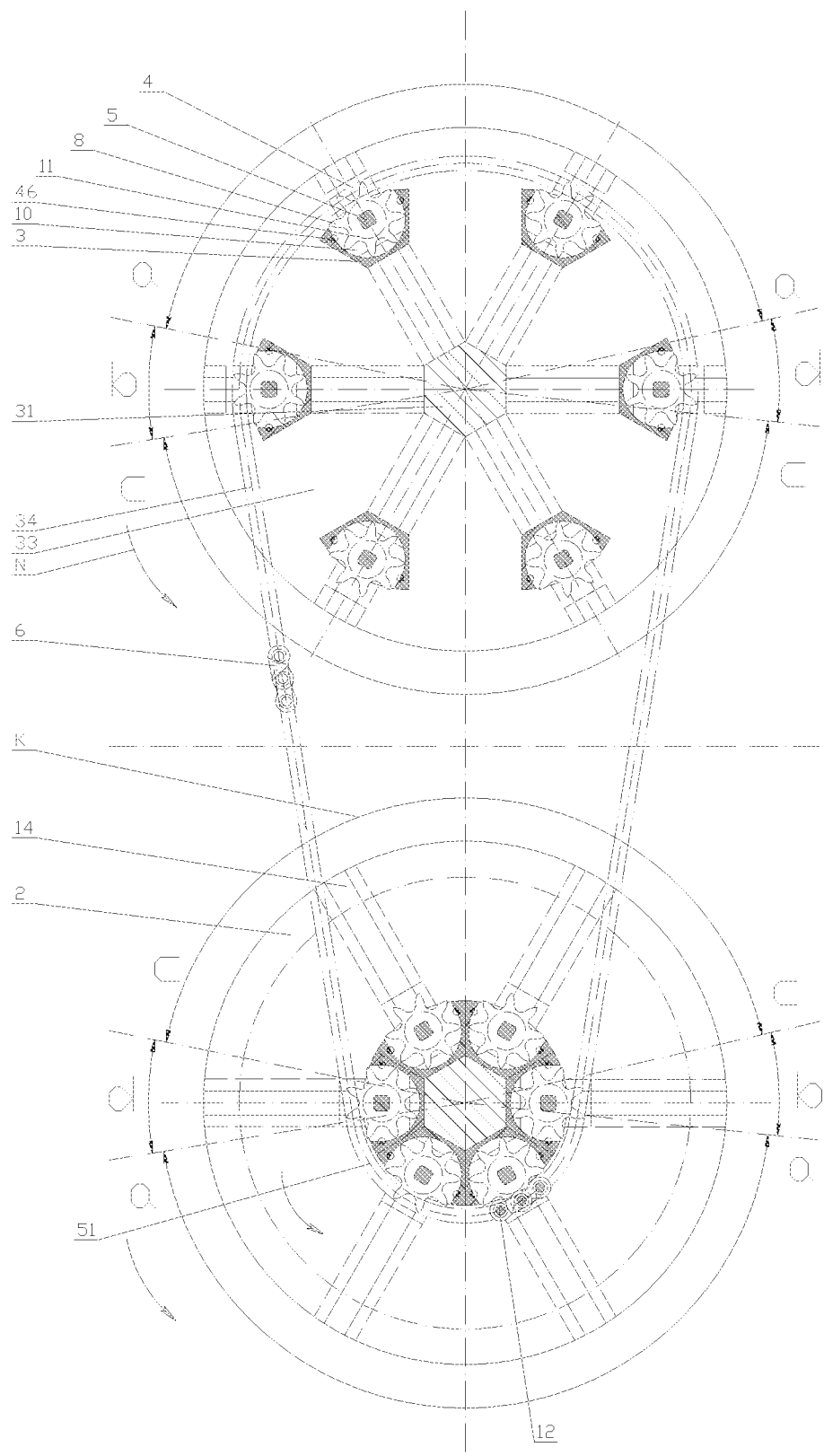
FIG. 5 is a front structural view of the stepless transmission having no tensioning wheel 54.

As can be seen in FIGS. 3 and 5, the chain 34 is pressed tightly against the moving cone disc spring 61 without the use of the tensioning wheel 54.

Figure 6:
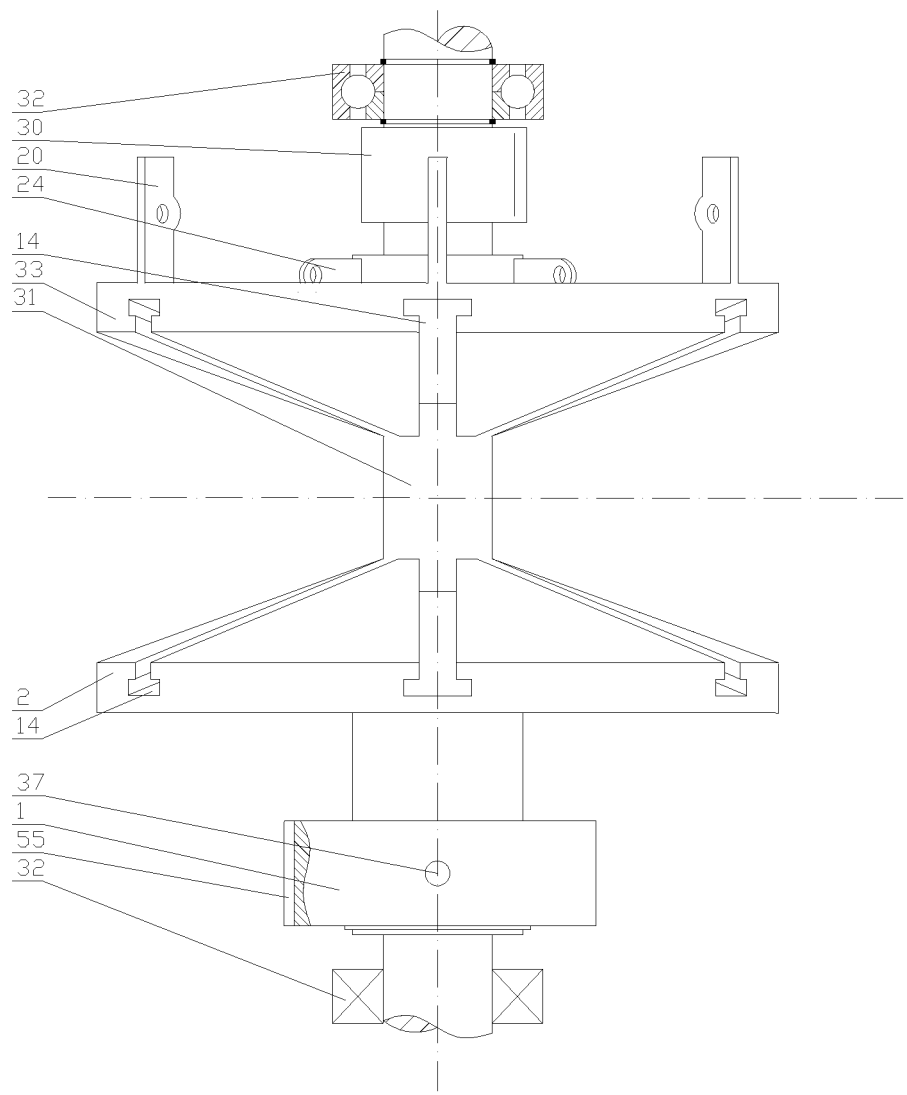
FIG. 6 is a structural view of the moving cone disc 2, the fixed cone disc 33 and the output shaft 31 in such a stepless transmission.
Figure 7:
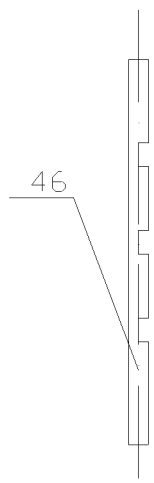
FIG. 7 is a structural view of the fixed friction plate positioning shaft 46.

FIG. 6 shows positions of the moving cone disc 2, the fixed cone disc 33 and the output shaft 31.

As can be seen in FIGS. 7, 16, 17, 18 and 19, one half (semicircular) of the fixed friction plate positioning shaft 46 is in the pulley 3, and the other half (semicircular) of the fixed friction plate positioning shaft 46 is in the fixed friction plate 10, such that the fixed friction plate 10 can only slide back and forth in the pulley 3 along an axial direction of the fixed friction plate positioning shaft 46. The fixed friction plate positioning shaft 46 has a notch corresponding to the movable friction plate chain wheel 8, such that the movable friction plate chain wheel 8 does not touch the fixed friction plate positioning shaft 46 when it is moving. A square hole in the center of the movable friction plate chain wheel 8 and a square hole in the center of the movable friction plate 11 are in shape-line fit with a square cross-section of the central shaft 5. When there is no pressing force, the movable friction plate chain wheel 8 and the movable friction plate 11 can only rotate together with the central shaft 5.

Figure 8:
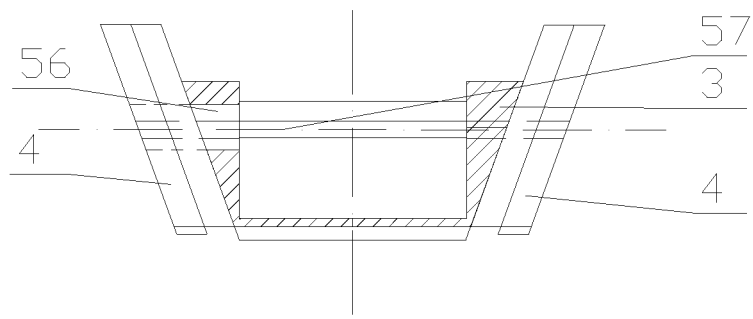
FIG. 8 is a structural view of the pulley 3.
Figure 9:
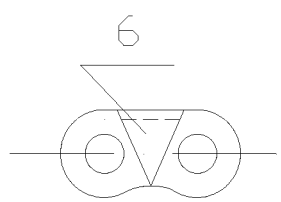
FIG. 9 is a front view of the chain edge piece 6.
Figure 10:
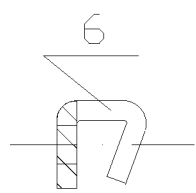
FIG. 10 is a right side view of FIG. 9.
Figure 11:
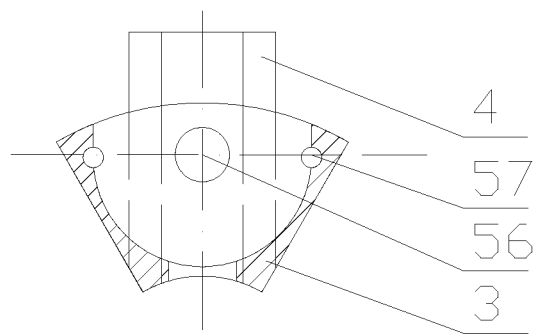
FIG. 11 is a left side view of FIG. 8.
Figure 15:
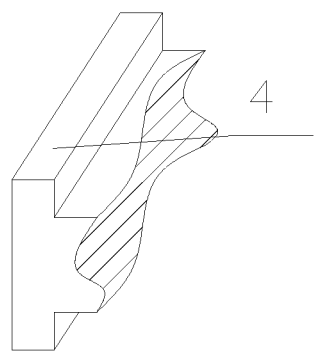
FIG. 15 is a structural view of the pulley slide rail 4.
Figure 16:
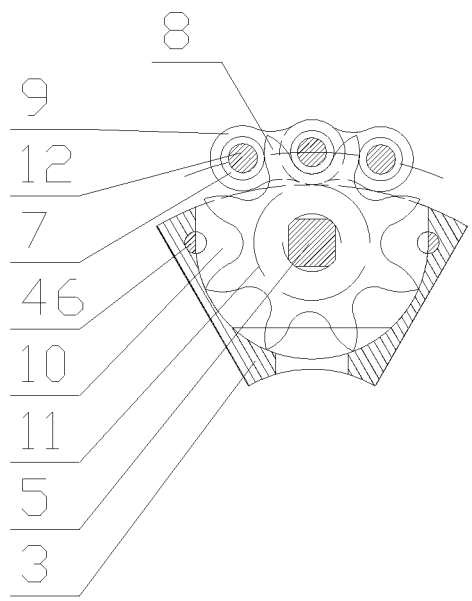
FIG. 16 is a structural view showing the position relationship of the pulley 3, the chain 34, the movable friction plate chain wheel 8, the fixed friction plate 10, the movable friction plate 11, and the fixed friction plate positioning shaft 46.
Figure 17:
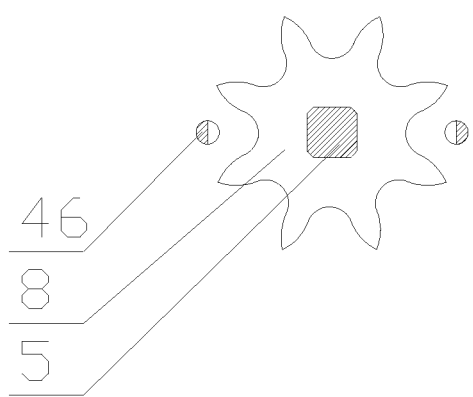
FIG. 17 is a structural view showing the position relationship of the fixed friction plate positioning shaft 46, the center shaft 5, and the movable friction plate chain wheel 8.
Figure 18:
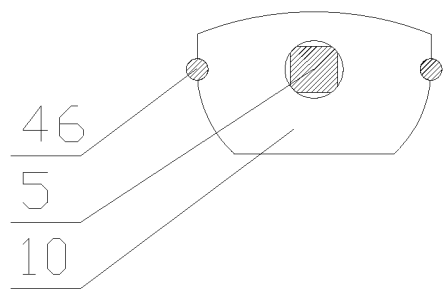
FIG. 18 is a structural view showing the position relationship of the fixed friction plate 10, the center shaft 5, and the fixed friction plate positioning shaft 46.
Figure 19:
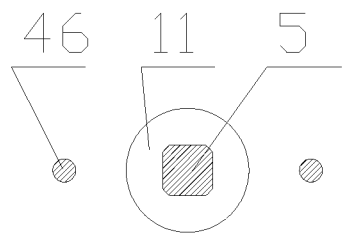
FIG. 19 is a structural view showing the position relationship of the movable friction plate 11, the center shaft 5, and the fixed friction plate positioning shaft 46.
Figure 20:
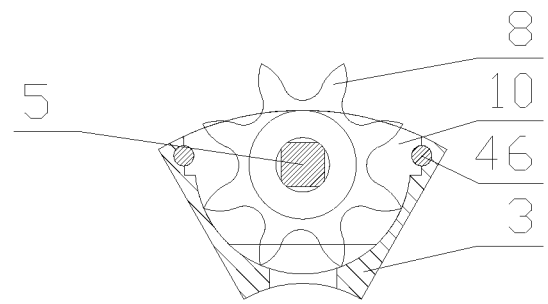
FIG. 20 is a structural view showing the position relationship of the pulley 3, the movable friction plate chain wheel 8, the fixed friction plate 10, the central shaft 5, the movable friction plate 11, and the fixed friction plate positioning shaft 46 in the second certain example.
Figure 21:
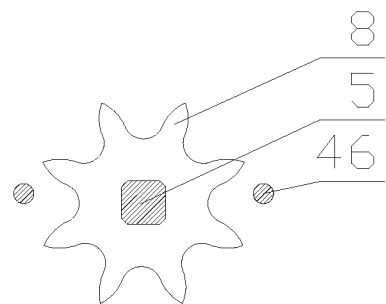
FIG. 21 is a structural view showing the position relationship of the central shaft 5, the movable friction plate chain wheel 8, and the fixed friction plate positioning shaft 46 in the second certain example.
Figure 22:
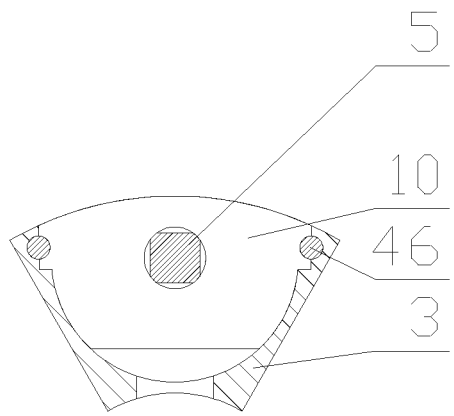
FIG. 22 is a structural view showing the position relationship of the central shaft 5, the fixed friction plate 10, the pulley 3 and the fixed friction plate positioning shaft 46 in the second certain example.
Figure 23:
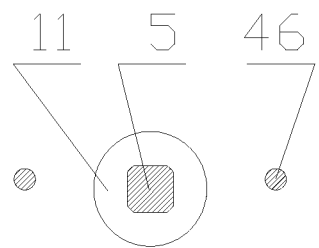
FIG. 23 is a structural view showing the position relationship of the movable friction plate 11, the central shaft 5, and the fixed friction plate positioning shaft 46 in the second certain example.

It can be seen, in FIGS. 8, 11 and 15, the position relationship between the pulley 3 and the pulley guide rail 4.

Figure 14:
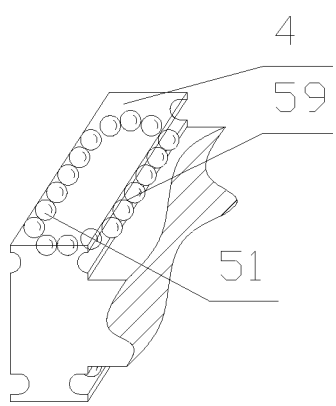
FIG. 14 is a structural view of the pulley slide rail 4 having a ball guide rail in the fifth certain example.

As can be seen in FIG. 14, in the fifth certain example, there are balls 59 and back balls 51 on the pulley slide rail 4, and both the balls 59 and the back balls 51 are half in the semi-circular groove of the pulley slide rail 4 and the other half in the semi-circular groove of the cone disc guide rail 14, which act as ball sliding bearings, and meanwhile the balls 59 and the back balls 51 are return balls for each other.

In FIGS. 20, 21, 22 and 23, in the second certain example, the fixed friction plate 10 stretches out two ears to match with the fixed friction plate positioning shaft 46. The movable friction plate chain wheel 8 has a sufficient distance from the fixed friction plate positioning shaft 46, and the movable friction plate chain wheel 8 does not touch the fixed friction plate positioning shaft 46 when it is moving even if there is no notch in the fixed friction plate positioning shaft 46.

Figure 24:
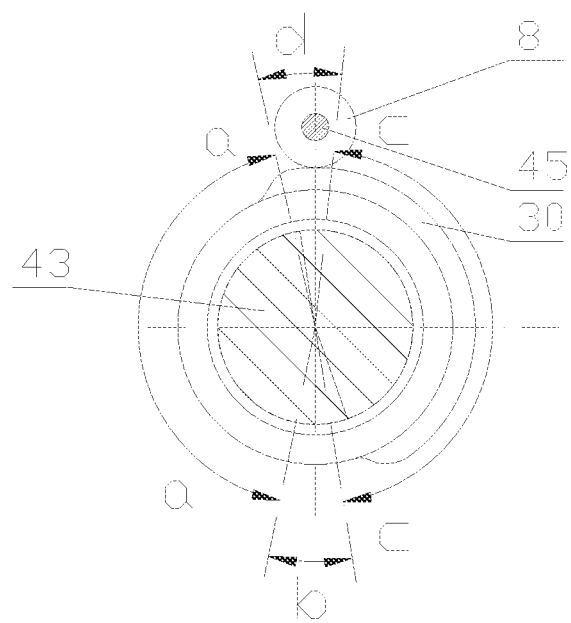
FIG. 24 is a structural view showing the cam 30 and the wheel 28, and the wheel 28 falls in a region d (i.e., an engaging region) of the cam 30.

In FIG. 24, when the wheel 28 falls in the separation region c of the cam 30, the wheel 28 is jacked up, and the movable friction plate chain wheel 8, the fixed friction plate 10, and the movable friction plate 11 can move freely.

Figure 25:
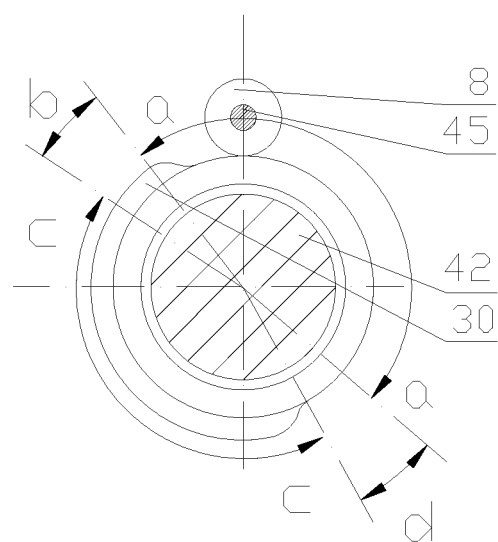
FIG. 25 is a structural view showing the cam 30 and the wheel 28, the wheel 28 falls in a region a (i.e., an engagement region) of the cam 30.

In FIG. 25, when the wheel 28 falls in the region a (i.e., an engagement region) of the cam 30, the wheel 28 is put down, and the movable friction plate chain wheel 8, the fixed friction plate 10, the movable friction plate 11, and the pulley 3 are pressed tightly together and integrated.

Figure 26:
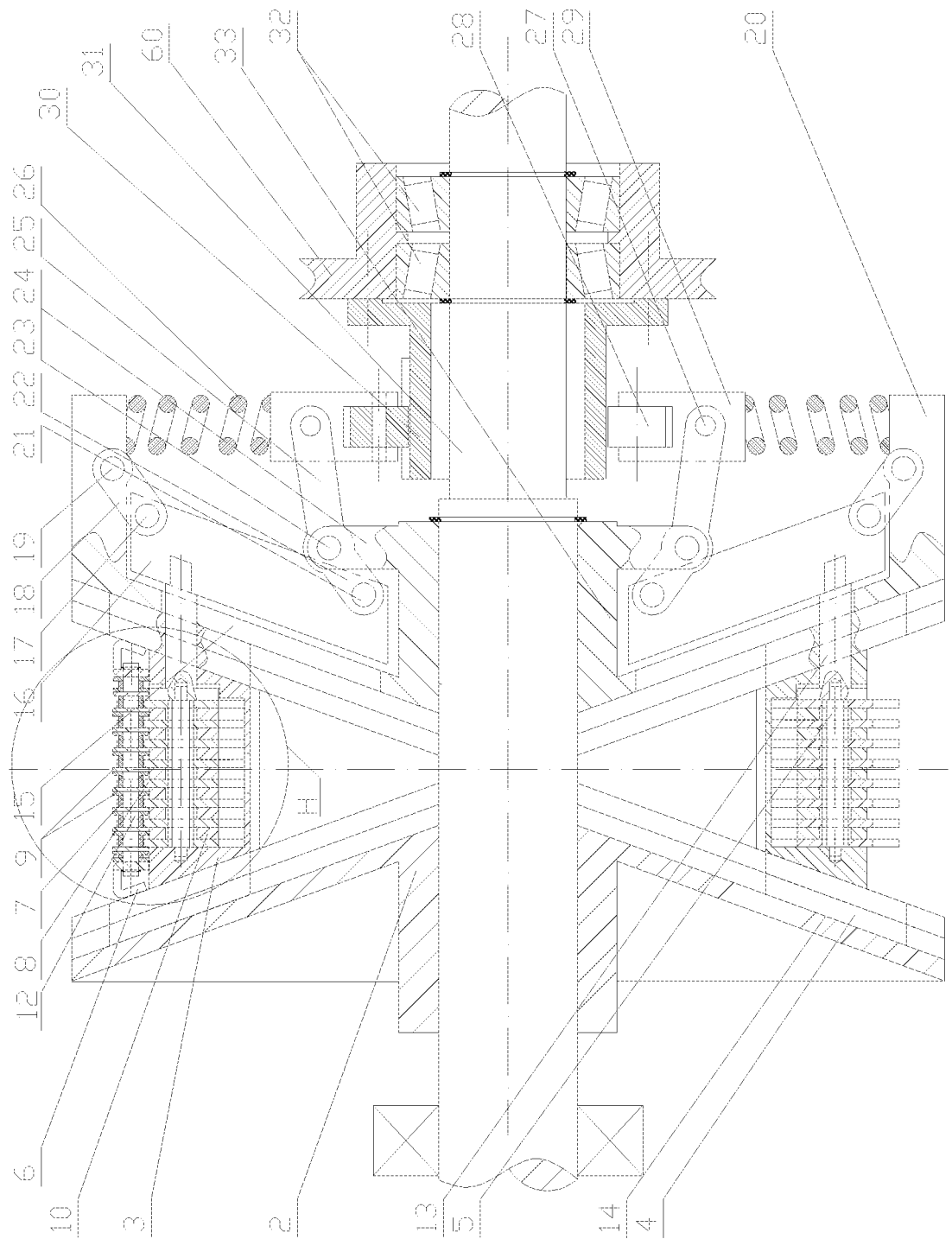
FIG. 26 is a structural view of the first certain example.

FIG. 26 is a structural view of the first certain example. In the pulley 3, the movable friction plate chain wheel 8 and the fixed friction plate 10 can be arranged alternatively and the movable friction plate 11 can be omitted.

In the first certain example, the motion principle of the first certain example: When the wheel 28 falls in the region a (i.e., an engagement region) of the cam 30, the elastic force of the pressure spring 26 acts on the movable friction plate chain wheel 8 through the wheel seat 29, the pressure bar 25, the second pressure hinge plate 22, the pressure plate 16, and the pressurizing shaft 13. The movable friction plate chain wheel 8 presses tightly against the fixed friction plate 10. A square hole in the center of the movable friction plate chain wheel 8 is in shape-line fit with a square cross-section of the central shaft 5. A semicircular notch of the fixed friction plate 10 is matched with the fixed friction plate positioning shaft 46. A pulley positioning shaft hole 57 is matched with the fixed friction plate positioning shaft 46. The fixed friction plate 10 is matched with the pulley 3 through the fixed friction plate positioning shaft 46, and the fixed friction plate 10 can only slide on the fixed friction plate positioning shaft 46 without rotation. When the wheel 28 falls in a region c (i.e., a separation region), the wheel 28 is jacked up by the cam 30, and the elastic force of the pressure spring 26 is exerted on the cam 30 by the wheel 28. The wheel 28 drives the wheel seat 29, the pressure bar 25, the second pressure hinge plate 22, and the pressure plate 16 to move simultaneously. The pressure plate 16 is disengaged from the pressurizing shaft 13, and the fixed friction plate 10 and the movable friction plate chain wheel 8 are released. The movable friction plate chain wheel 8 are freely rotated, and are freely overlapped with the chain 34.

When the pressurizing shaft 13 presses tightly against the movable friction plate chain wheel 8 and the fixed friction plate 10, the movable friction plate chain wheel 8, the fixed friction plate 10, the fixed friction plate positioning shaft 46 and the pulley 3 are fixed together. When the pressurizing shaft 13 releases the movable friction plate chain wheel 8 and the fixed friction plate 10, the movable friction plate chain wheel 8 and the fixed friction plate 10 are disengaged, and the movable friction plate chain wheel 8 can rotate freely. The chain shaft wheel 7 on the chain 34 freely overlaps the movable friction plate chain wheel 8. Then when the wheel 28 falls in the region a (i.e., an engagement region) of the cam 30, the chain 34 engages with the movable friction plate chain wheel 8, i.e., the chain 34, the fixed cone disc 33 and the movable cone disc 2 can transmit power to each other via the movable friction plate chain wheel 8, the fixed friction plate 10 and the pulley 3. The fixed cone disc 33 and the moving cone disc 2 then transmit power from the input shaft 42 to the output shaft 31 through the chain 34.

Figure 27:
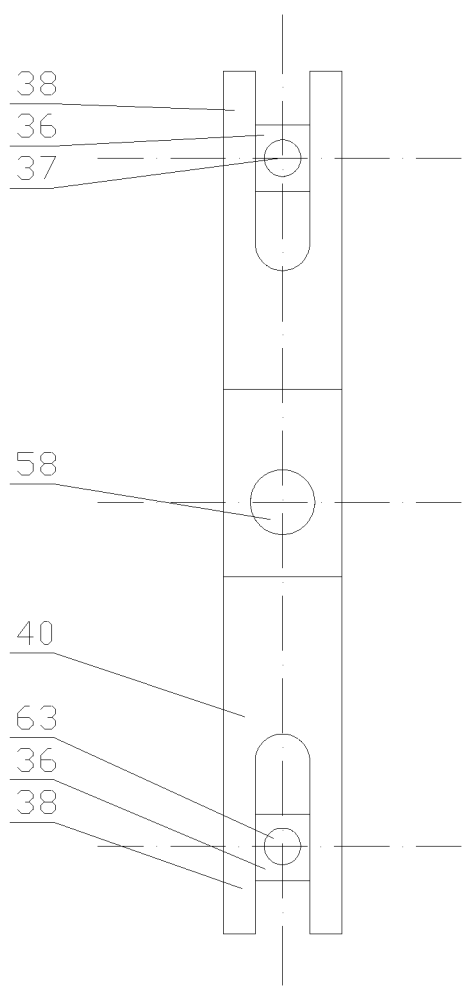
FIG. 27 is a structural view of the speed regulating lever 40, a speed regulating lever fork slider 36, the speed regulating nut hinge pin 37, and the stopper hinge pin 63.
Figure 28:
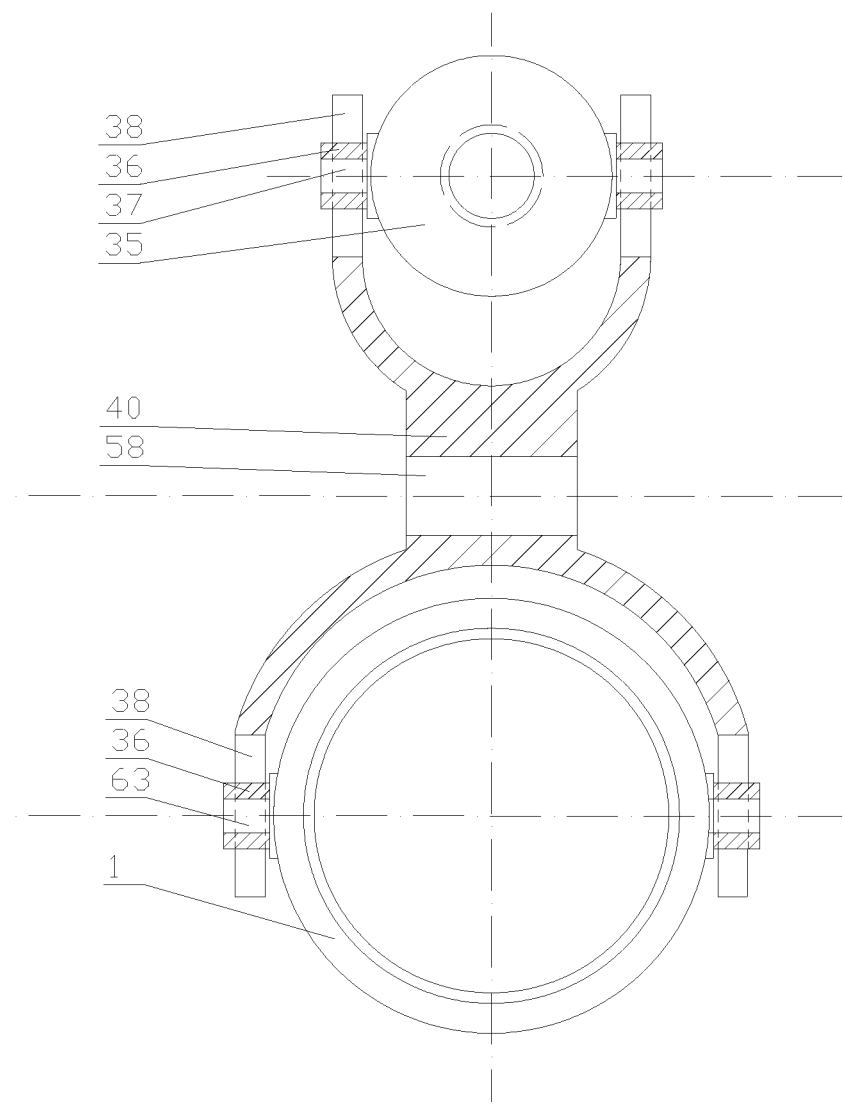
FIG. 28 is a right side view of FIG. 27.

It can be seen in FIGS. 27 and 28 the structure of the speed regulating lever 40.

A third certain example: the speed regulating nut 35 and the stopper 1 are not on the same vertical line.

Figure 29:
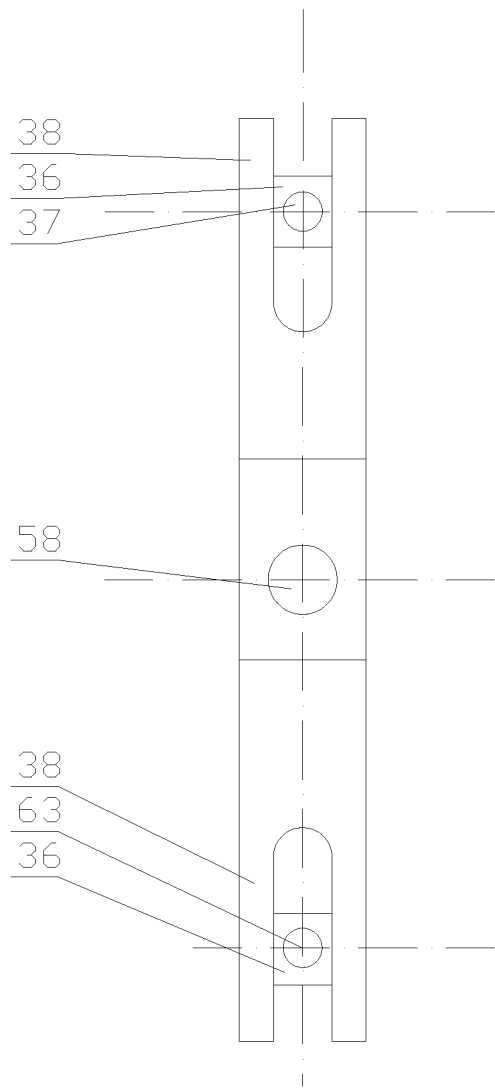
FIG. 29 is a structural view of the speed regulating lever 40, the speed regulating lever fork slider 36, the speed regulating nut hinge pin 37, and the stopper hinge pin 63 in the third certain example.
Figure 30:
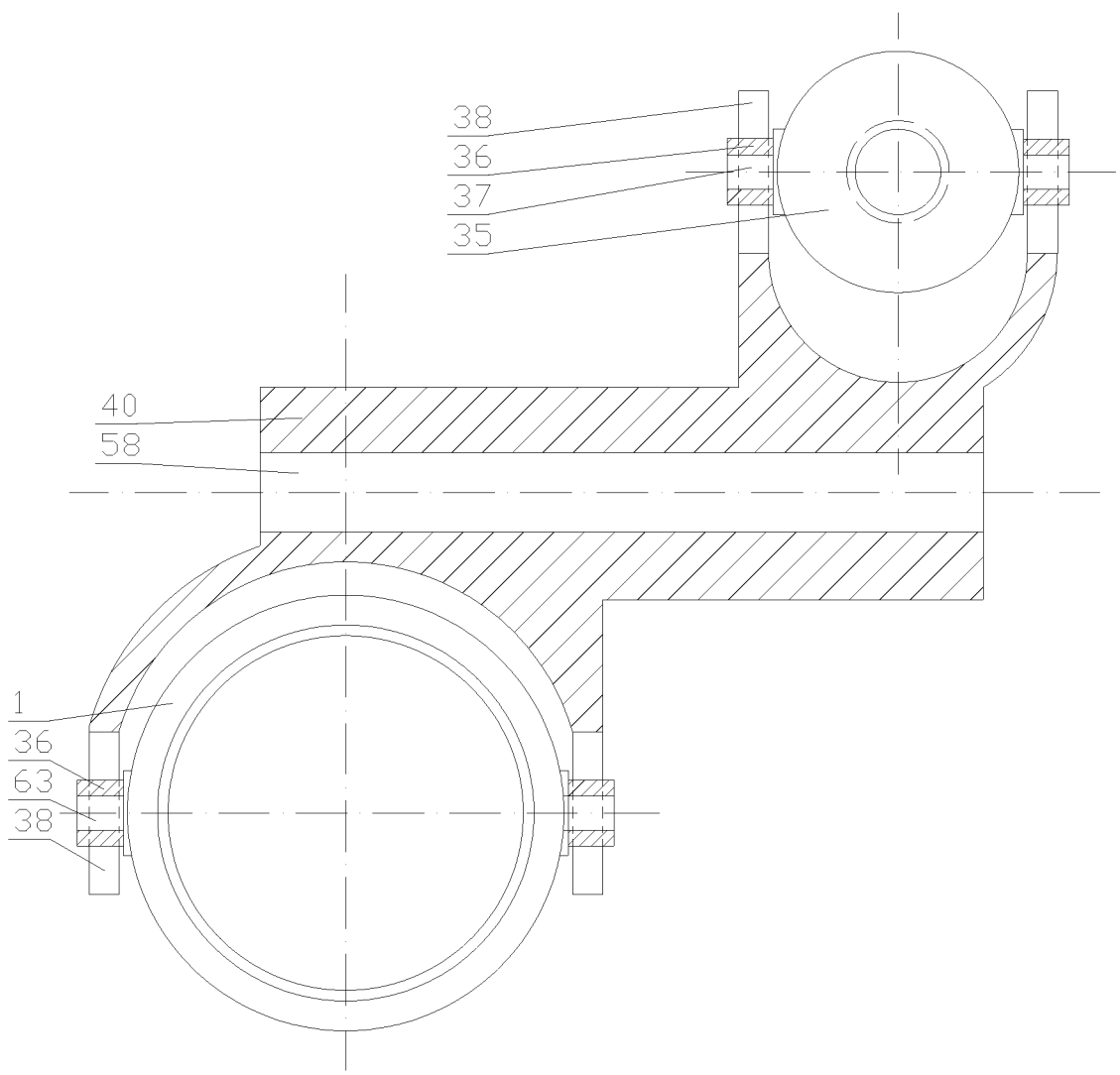
FIG. 30 is a right side view of FIG. 29.

FIGS. 29 and 30 are structural views of the speed regulating lever 40, the speed regulating lever fork slider 36, the speed regulating nut hinge pin 37, and the stopper hinge pin 63 in a third certain example.

Figure 12:
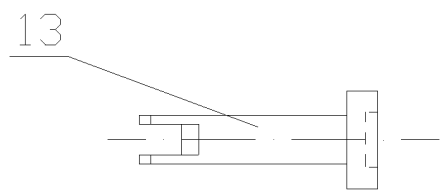
FIG. 12 is a structural view of the pressurizing shaft 13.
Figure 13:
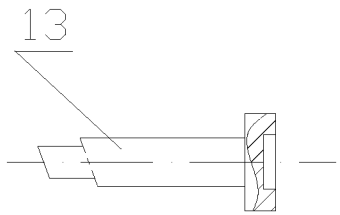
FIG. 13 is a left side view of FIG. 12.

FIGS. 12 and 13 are structural views of the pressurizing shaft 13, and the pressurizing shaft 13 has a groove at one end and is engaged with the pressure plate 16.

Figure 31:
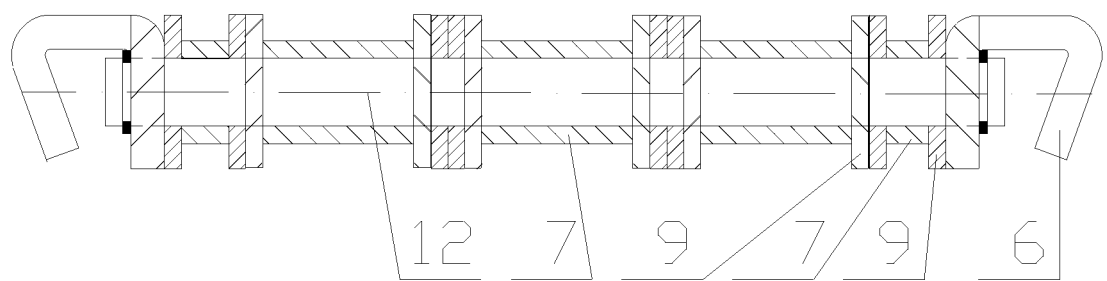
FIG. 31 is a structural view of the chain 34.
Figure 32:
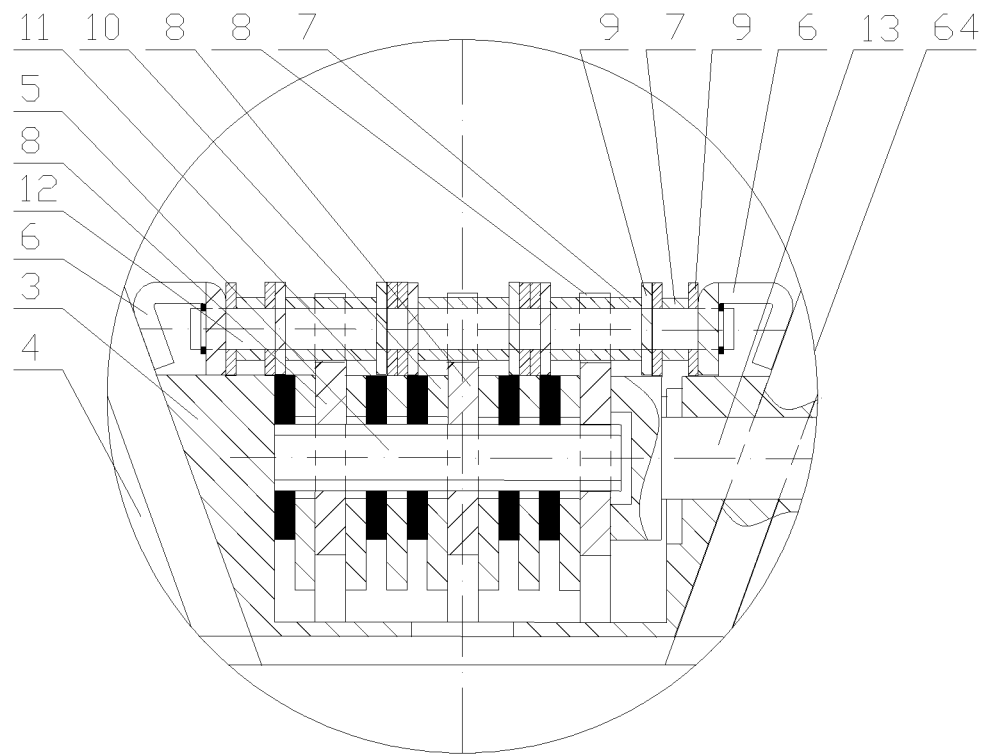
FIG. 32 is an enlarged view of an exploded view A of FIG. 1.
Figure 33:
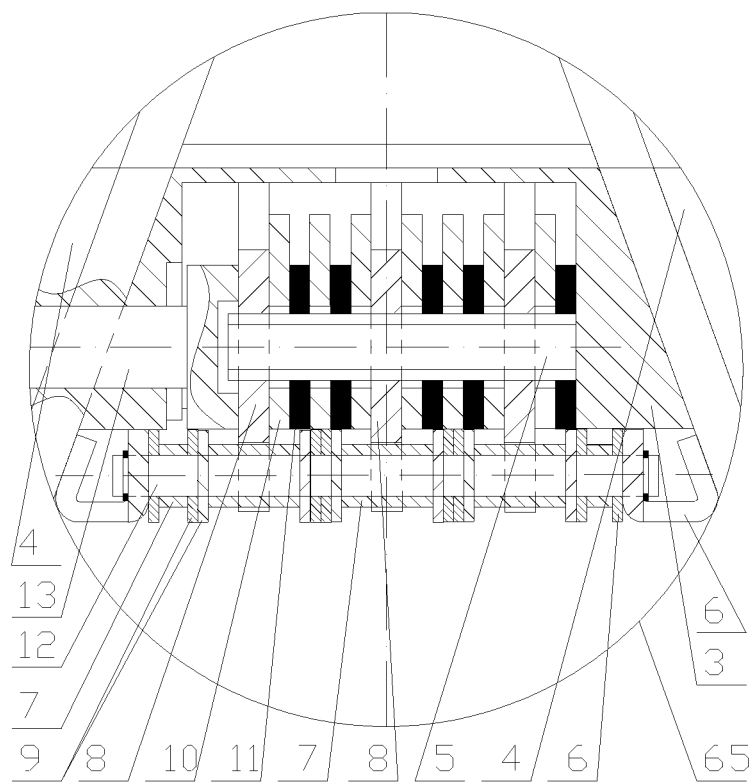
FIG. 33 is an enlarged view of an exploded view B of FIG. 1.
Figure 34:
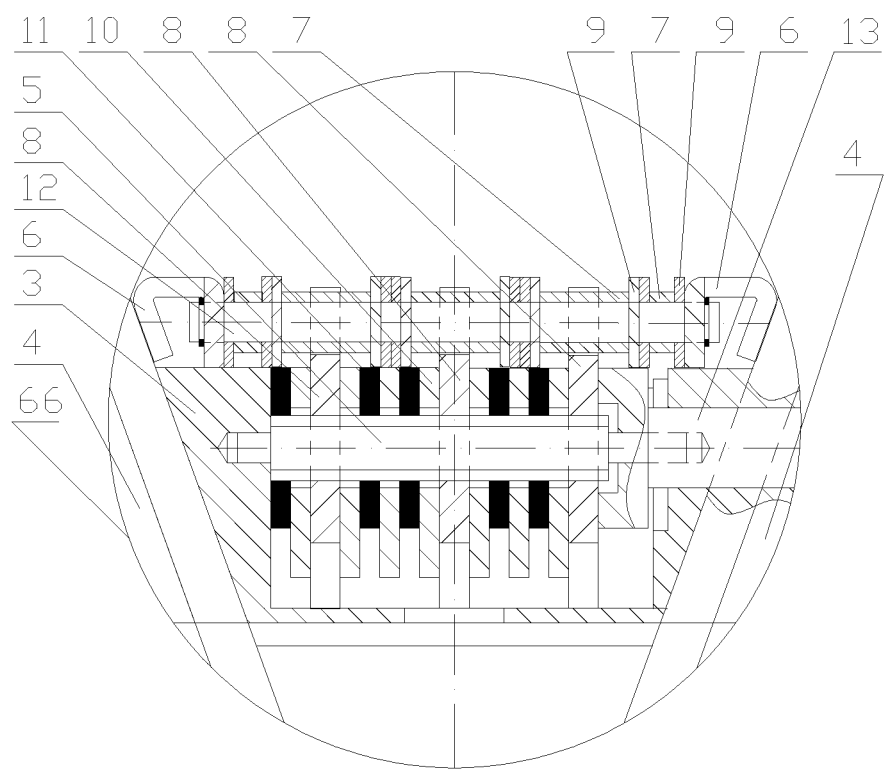
FIG. 34 is an enlarged view of an exploded view D of FIG. 2.
Figure 35:
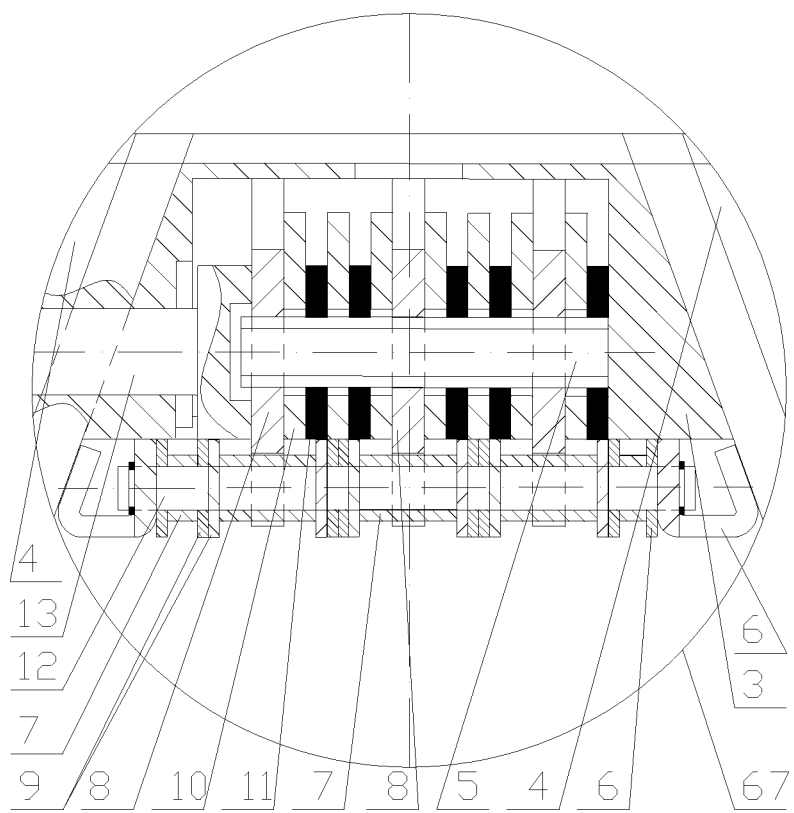
FIG. 35 is an enlarged view of an exploded view E of FIG. 2.
Figure 36:
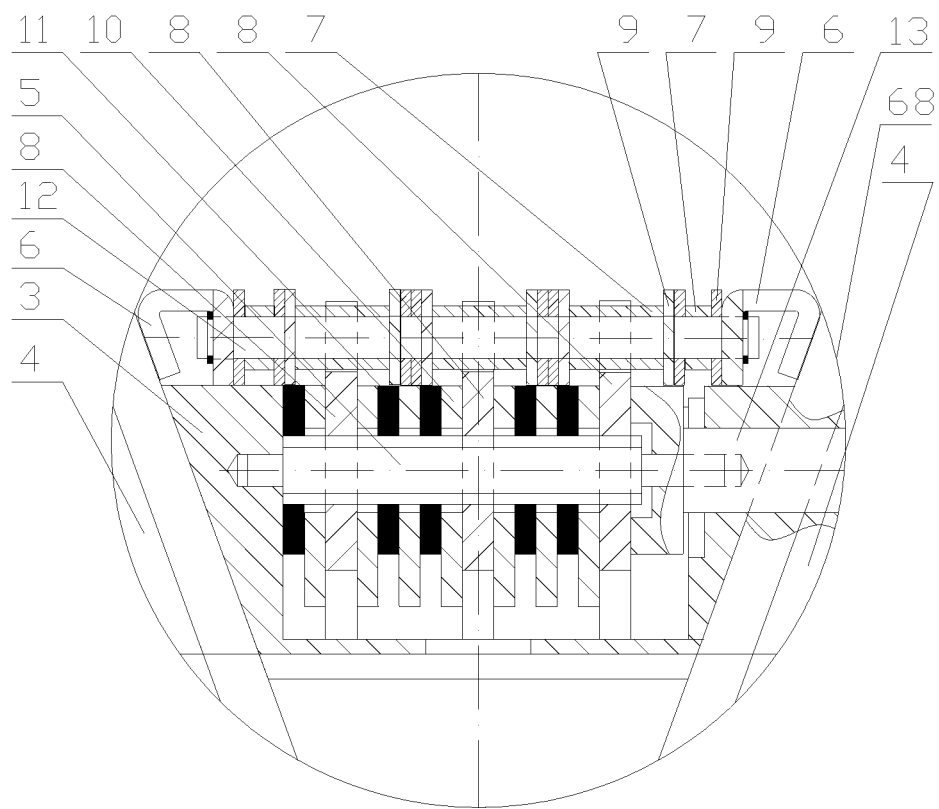
FIG. 36 is an enlarged view of an exploded view F of FIG. 3.
Figure 37:
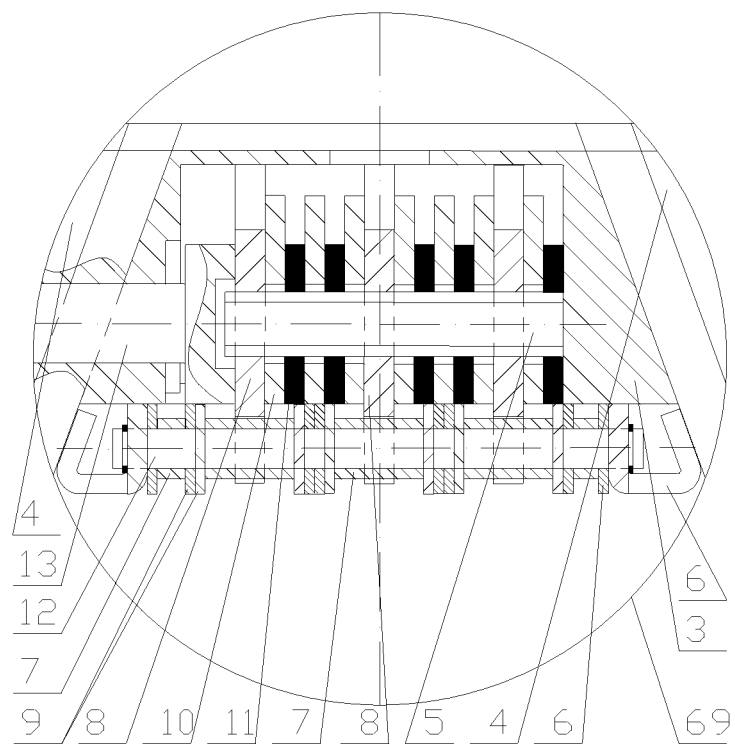
FIG. 37 is an enlarged view of an exploded view G of FIG. 3.
Figure 38:
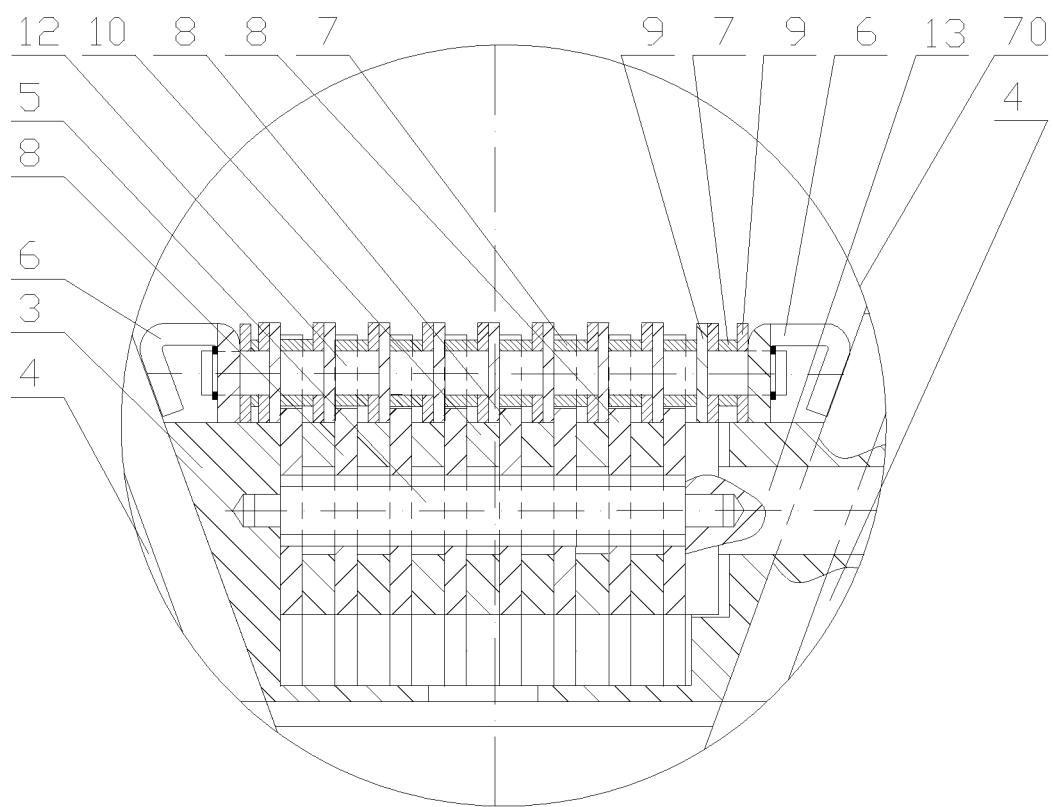
FIG. 38 is an enlarged view of an exploded view H of FIG. 26.

FIG. 31 is a structural view of the chain 34 which is composed of a chain shaft 12, a chain shaft wheel 7, a chain piece 9, and a chain edge piece 6.

Elements shown in figures:

1: stopper;
2: moving cone disc;
3: pulley;
4: pulley slide rail;
5: central shaft;
6: chain edge piece;
7: chain shaft wheel;
8: movable friction plate chain wheel;
9: chain piece;
10: fixed friction plate;
11: movable friction plate;
12: chain shaft;
13: pressurizing shaft;
14: cone disc guide rail;
15: cone disc pressurizing shaft groove;
16: pressure plate;
17: first pressure plate hinge pin;
18: first pressure hinge plate;
19: cantilever hinge pin;
20: fixed cone disc cantilever;
21: second pressure plate hinge pin;
22: second pressure hinge plate;
23: fixed cone disc support hinge pin;
24: fixed cone disc support;
25: pressure bar;
26: pressure spring;
27: pressure bar hinge pin;
28: wheel;
29: wheel seat;

30: cam;
31: output shaft;
32: bearing;
33: fixed cone disc;
34: chain;
35: speed regulating nut;
36: speed regulating lever fork slider;
37: speed regulating nut hinge pin;
38: speed regulating lever fork;
K indicates interval range;
40: speed regulating lever;
41: speed regulating lever shaft;
42: input shaft;
43: speed regulating screw;
M indicates speed regulating screw rotation direction;
45: wheel shaft;
46: fixed friction plate positioning shaft;
51: back balls;
N indicates cone disc rotation direction;
53: tensioning wheel axis;
54: tensioning wheel;
55: stopper sliding key;
56: pressurizing shaft hole;
57: pulley positioning shaft hole;
58: speed regulating lever shaft hole;
59: balls;
60: box;
61: moving cone disc spring;
62: moving cone disc spring seat;
63: stopper hinge pin.

What is claimed is:

1. A chain type stepless transmission, comprising: a box, an input shaft, an output shaft, a fixed cone disc, a moving cone disc, a chain having a chain shaft wheel, a movable friction plate chain wheel, a pulley, a fixed friction plate, a fixed friction plate positioning shaft, a pressurizing shaft, and a chain shaft wheel, wherein
the chain and the movable friction plate chain wheel are freely overlapped;
when the pressurizing shaft presses tightly against the movable friction plate chain wheel and the fixed friction plate, the movable friction plate chain wheel, the fixed friction plate, the fixed friction plate positioning shaft, and the pulley are fixed together, and the movable friction plate chain wheel is engaged with the chain to transmit power; and
when the pressurizing shaft releases the movable friction plate chain wheel and the fixed friction plate, the movable friction plate chain wheel is disengaged from the fixed friction plate, the movable friction plate chain wheel rotates freely, and the chain shaft wheel on the chain freely overlaps the movable friction plate chain wheel.

2. The chain type stepless transmission according to claim 1, further comprising a wheel, a cam, a pressure spring, a wheel seat, a pressure bar, a second pressure hinge plate, and a pressure plate, wherein
when the wheel falls in an engagement region of the cam, an elastic force of the pressure spring acts on the movable friction plate chain wheel through the wheel seat, the pressure bar, the second pressure hinge plate, the pressure plate and the pressurizing shaft, the movable friction plate chain wheel presses tightly against the fixed friction plate, and the movable friction plate chain wheel, the fixed friction plate and the pulley are fixed together;
when the wheel falls in a separation region of the cam, the wheel is jacked up by the cam, the elastic force of the pressure spring is exerted on the cam by the wheel, the wheel drives the wheel seat, the pressure bar, the second pressure hinge plate, and the pressure plate to move simultaneously, the pressure plate is disengaged from the pressurizing shaft, the fixed friction plate and the movable friction plate chain wheel are released, resulting in that the pressing force to the fixed friction plate and the movable friction plate chain wheel is disappeared, and the movable friction plate chain wheel is freely moved.

3. The chain type stepless transmission according to claim 1, further comprising a cam, wherein
when the pressurizing shaft releases the movable friction plate chain wheel, the movable friction plate chain wheel is disengaged from the fixed friction plate, the movable friction plate chain wheel is freely moved, and the chain freely overlaps the movable friction plate chain wheel;
then when the wheel falls in an engagement region of the cam, the pressurizing shaft presses tightly against the movable friction plate chain wheel and the fixed friction plate, the movable friction plate chain wheel, the fixed friction plate and the pulley are fixed together, the chain, the fixed cone disc and the movable cone disc transmit power to each other through the movable friction plate chain wheel, the fixed friction plate and the pulley that are fixed together, and the fixed cone disc and the moving cone disc then transmit power from the input shaft to the output shaft through the chain.

4. The chain type stepless transmission according to claim 1, further comprising a moving cone disc spring and a moving cone disc spring base, wherein
the moving cone disc spring is behind the moving cone disc on the output shaft, the moving cone disc spring applies a pressure to the moving cone disc for speed regulation;
the moving cone disc spring has one end against the moving cone disc and the other end against the moving cone disc spring base that is fixed on the output shaft, and the moving cone disc spring pushes the moving cone disc to press tightly on the chain.

5. The chain type stepless transmission according to claim 1, further comprising a moving cone disc spring and a moving cone disc spring base, wherein
there is a moving cone disc spring behind the moving cone disc on the input shaft, and the moving cone disc spring applies a pressure to the moving cone disc for speed regulation;
the moving cone disc spring has one end against the moving cone disc and the other end against a moving cone disc spring base that is fixed on the input shaft, and the moving cone disc spring pushes the moving cone disc against the chain.

6. The chain type stepless transmission according to claim 1, further comprising a pulley slide rail, balls, and back balls, wherein
the balls and the back balls are on the pulley slide rail, and both the balls and the back balls are half in a semi-circular groove of the pulley slide rail and the other half in a semi-circular groove of a cone disc guide rail, so as to act as ball sliding bearings.

7. The chain type stepless transmission according to claim 1, further comprising a pressure spring, a wheel, a cam, a pressure bar, and a fixed cone disc cantilever, wherein the pressure spring has one end acting on the pressure bar and the other end abutting against the fixed cone disc cantilever;

when the wheel falls in an engagement region of the cam, the pressure spring is extended;

when the wheel falls in a separation region of the cam, the wheel is jacked up by the cam, and the pressure spring is compressed.

\* \* \* \* \*